United States Patent [19]

Seki et al.

[11] Patent Number: 5,065,332

[45] Date of Patent: Nov. 12, 1991

[54] FIGURE ELEMENT REVISING METHOD

[75] Inventors: Masaki Seki; Takashi Takegahara, both of Tokyo; Akira Kajitani, Yamanashi, all of Japan

[73] Assignee: Fanuc, Ltd., Minamitsuru, Japan

[21] Appl. No.: 368,349

[22] PCT Filed: Oct. 19, 1988

[86] PCT No.: PCT/JP88/01058

§ 371 Date: Jun. 16, 1989

§ 102(e) Date: Jun. 16, 1989

[87] PCT Pub. No.: WO89/04011

PCT Pub. Date: May 5, 1989

[30] Foreign Application Priority Data

Oct. 20, 1987 [JP] Japan ................................ 62-265052

[51] Int. Cl.$^5$ ........................................... G05B 19/403
[52] U.S. Cl. ................................ 364/474.22; 364/192; 364/474.23; 364/474.27
[58] Field of Search ...................... 364/474.22, 474.23, 364/474.26, 191, 192, 474.27

[56] References Cited

U.S. PATENT DOCUMENTS

| | | | |
|---|---|---|---|
| 4,723,203 | 2/1988 | Kishi et al. | 364/474.22 X |
| 4,901,220 | 2/1990 | Matsumura et al. | 364/474.26 X |
| 5,006,977 | 4/1991 | Seki et al. | 364/192 |

Primary Examiner—Jerry Smith
Assistant Examiner—Allen M. Lo
Attorney, Agent, or Firm—Staas & Halsey

[57] ABSTRACT

A predetermined figure element ($C_2$) already defined is designated, and a figure definition statement of the designated figure element ($C_2$) is revised to produce a figure element ($C_2'$). When an error occurs in the figure definition statement of another figure element ($S_1$) owing to the revision of the above-mentioned figure definition statement, the figure definition statement (M) in which the error has occurred is displayed on a display screen (106) to make revision possible, namely the another figure element ($S_1$) specified by the figure definition statement in which the error has occurred and a figure element ($C_3$) defined using the another figure element ($S_1$) are displayed in colors that differ from each other, and the figure definition statement in which the error occurred is revised.

8 Claims, 7 Drawing Sheets

| EXECUTION | POINT/PATTERN DEFINITION | | STRAIGHT LINE DEFINITION | | CIRCLE DEFINITION | | | SPECIAL FIGURE DEFINITION | |
|---|---|---|---|---|---|---|---|---|---|
| FIGURE DATA INPUT | . 1a | 1b | — 2a | — 2b | 3a | 3b | 3c | | |
| NEW DEFINITION | ⊙ 1c | | 2d | 2e | | | | | |
| | | | 2g | 2f | | | | | |
| INITIAL SETTING | | | | | | | | | |
| SELECTION OF FIGURES | | | REDEFINITION | | REDEFINITION | | | | |

| ELEMENT | FIGURE | |
|---|---|---|
| DELETION | CREATE | DELETION |
| PART DELETION | SHAPE REVISION | |
| | SHAPE REVISION END | |

FIGURE ELEMENT REVISING METHOD

BACKGROUND OF THE INVENTION

1. Field of Invention

This invention relates to a figure element revising method and, more particularly, to a figure element revising method for displaying and revising a group of figure elements including defined figure elements and figure elements defined using the defined figure elements.

2. Description of the Related Art

In an automatic programming system for creating NC data using an automatic programming language such as APT (automatic programming tools) or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted into NC data comprising NC data (EIA codes or ISO codes) in a format capable of being executed by an NC unit.

Figure 8:
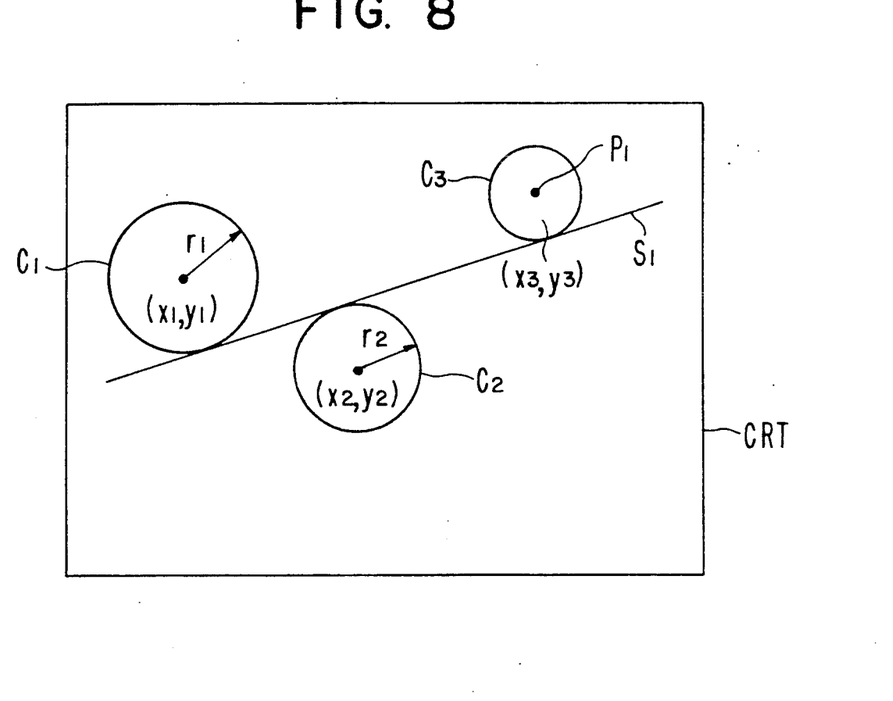
FIGS. 8 through 9 and 10(a)–10(f) are diagrams describing examples of the prior art.

For example, in the creation of a figure definition statement based on the automatic programming language, figure definition is performed by defining a point $P_1$ and circles $C_1$, $C_2$ as follows using a keyboard or tablet:

$$C_1 = x_1, y_1, r_1 \quad (1)$$

$$C_2 = x_2, y_2, r_2 \quad (2)$$

$$P_1 = x_3, y_3 \quad (3)$$

as shown in FIG. 8. A straight line $S_1$ and a circle $C_3$ are then defined as follows using the defined figure elements:

$$S_1 = C_1, C_2, B, A \quad (4)$$

$$C_3 = P_1, S_1 \quad (b\ 5)$$

In the foregoing, equation (1) signifies a circle $C_1$ of center $(x_1, y_1)$ and radius $r_1$;

equation (2) signifies a circle $C_2$ of center $(x_2, y_2)$ and radius $r_2$;

equation (3) signifies a point whose coordinates are $x_3, y_3$;

equation (4) signifies a straight line (tangent) $S_1$ that is tangent to the lower side of circle $C_1$ and the upper side of circle $C_2$; and equation (5) signifies a circle $C_3$ tangent to the straight line $S_1$ and having he point $P_1$ as its center. The alphabetic character A in (4) is a qualifier meaning "above", and the alphabetic character B is a qualifier meaning "below".

Figure 10A:
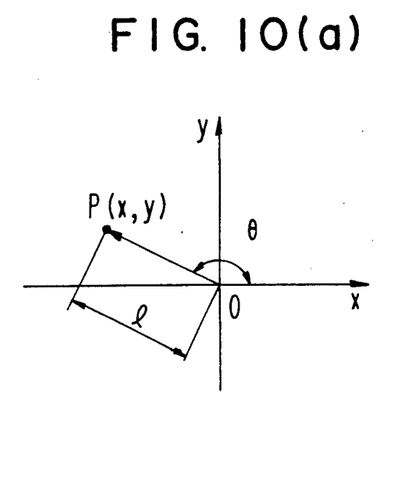
Figure 10B:
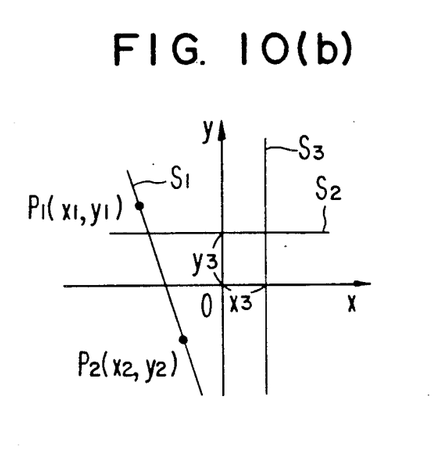
Figure 10C:
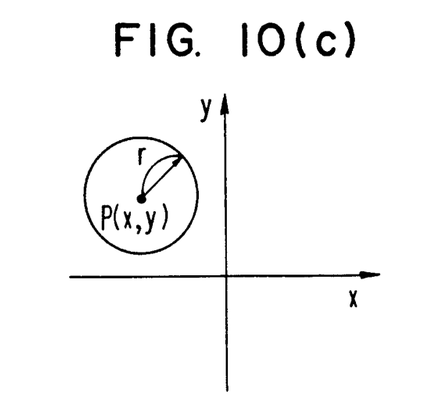

There are two methods of figure definition, as will be understood from the foregoing. A first definition method entails defining points, straight lines and circles using absolute numeric data. A point is defined as $$P = x, y$$

using the coordinates $(x,y)$ of the point [see FIG. 10(a)]; a straight line is defined as $$S = x_1, y_1, x_2, y_2$$

using coordinate points $(x_1, y_1)$, $(x_2, y_2)$ of two points $P_1$, $P_2$ through which the straight line passes [see FIG. 10(b)]; and a circle is defined as $$C = x, y, r$$

using the coordinates $(x,y)$ of the center of the circle and the radius r of the circle [see FIG. 10(c)]. A figure definition statement based on the first definition method shall be referred to as a first definition statement.

Figure 10D:
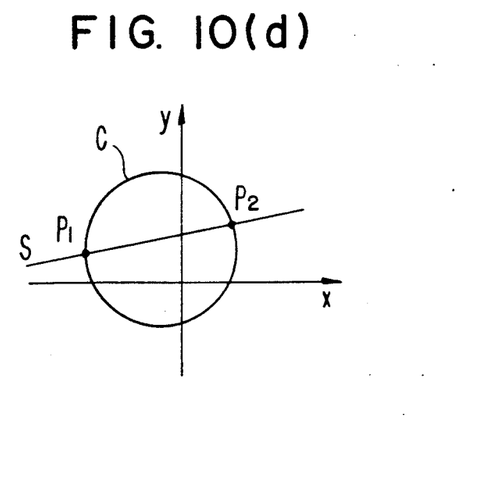

The second definition method entails defining straight lines and circles using other points, straight lines and circles that have already been defined. For example, point $P_1$ [see FIG. 10(d)] is defined as follows:

$$P_1 = S, C, L$$

Figure 10E:
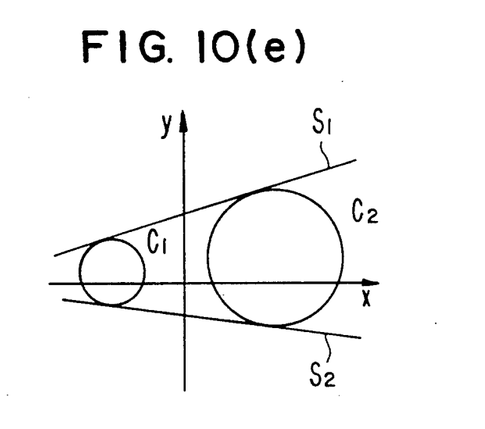

(the alphabetic character L is a qualifier meaning "left"); the straight lines $S_1$, $S_2$ [see FIG. 10(e)] are defined as follows:

$$S_1 = C_1, C_2, A, A$$

$$S_2 = C_1, C_2, B, B$$

Figure 10F:
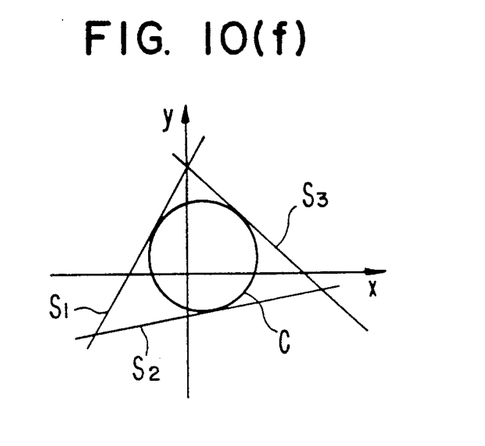

(the alphabetic character A is a qualifier meaning "above", and the alphabetic character B is a qualifier meaning "below"); and the circle C [see FIG. 10(f)] is defined as follows, by way of example:

$$C = S_1, S_2, S_3, R, A, L$$

(the alphabetic character R is a qualifier meaning "right"). A figure definition statement based on the second definition method shall be referred to as a second definition statement. The foregoing method in which elements already defined are used to define other elements is only one example, there being many other methods of definition available.

When figure definition is performed, the arrangement is such that a figure element is defined by the first definition statement, and another figure element is defined by the second definition statement based on the figure element in accordance with the first definition statement.

Figure 9:
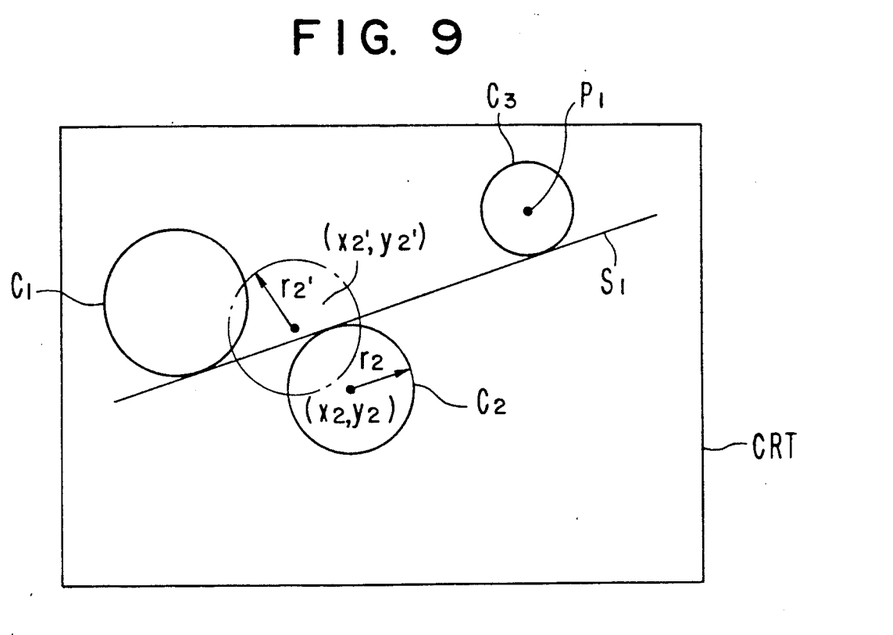

There are cases where it is desired to modify the center $(x_2, y_2)$ and radius $r_2$ of the circle $C_2$, which is an example of an already defined figure element (FIG. 8), to $(x_2', y_2')$ and $r_2'$, respectively, to arrive at the circle indicated by the broken line in FIG. 9. When the definition statement of circle $C_2$ is modified to $$C_2 = x_2', y_2', r_2'$$

in such case, the straight line $S_1$ defined as being tangent to the lower side of circle $C_1$ and the upper side of circle $C_2$ fails to exist and an error is generated. When the error occurs, automatic programming cannot resume until the error is removed. Consequently, in the prior art, it is necessary for the operator to manually call a figure definition statement revision screen, search for all error locations from the figure definition statement, perform redefinition, display the redefined figure element and verify the same. This is a troublesome operation.

SUMMARY OF THE INVENTION

Accordingly, an object of the invention is to provide a figure element revising method in which it is possible to easily and rapidly eliminate any error that might be generated, by revision of a figure element, in a figure definition statement which utilizes the revised figure element.

Another object of the invention is to provide a figure element revising method whereby a figure definition statement in which an error has occurred can be easily and rapidly revised into another correct figure definition statement.

A further object of the invention is to provide a figure element revising method whereby a figure definition statement in which an error has occurred and a figure element based on this figure definition statement can be easily visually recognize.

A further object of the invention is to provide a figure element revising method in which it is unnecessary to change over to a revision screen each time an error occurs.

In accordance with the present invention, the foregoing objects are attained by a first step of displaying an already defined figure element, designating a predetermined figure element and revising a figure definition statement of the designated figure element, a second step of checking whether an error has occurred in another figure element statement due to revision of the first-mentioned definition statement, a third step of displaying the figure definition statement in which the error has occurred on a display screen, and displaying, in colors that differ from each other, the figure element prior to revision specified by the figure definition statement in which the error has occurred, and another figure element defined using this figure element prior to revision, and a fourth step of revising the figure definition statement in which the error has occurred.

DESCRIPTION OF THE PREFERRED EMBODIMENT

Figure 1:
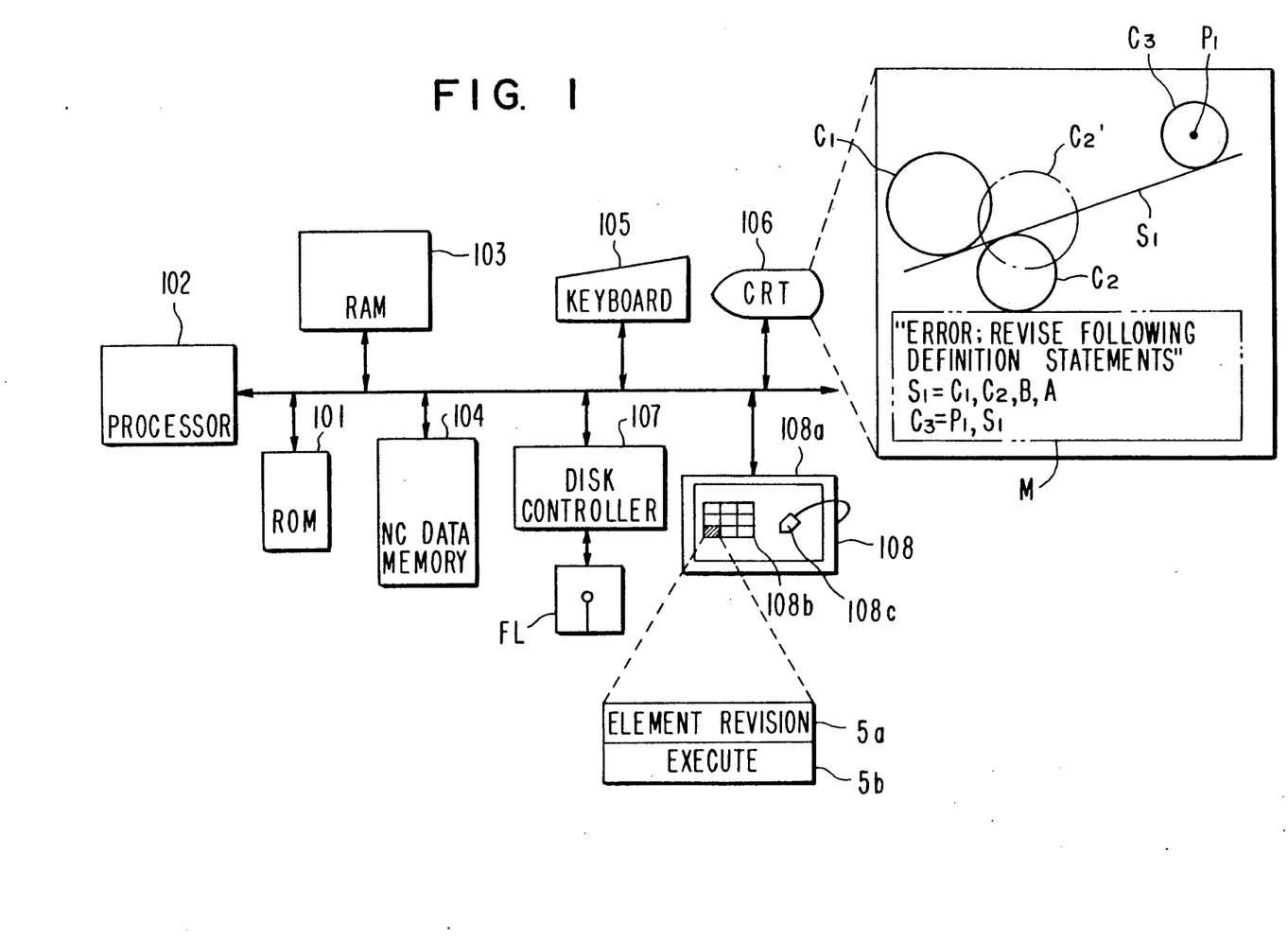
FIG. 1 is a block diagram of an apparatus for practicing the present invention.

FIG. 1 is a block diagram of an apparatus for practicing the present invention.

Numeral 101 denotes a ROM storing a loading program and the like, 102 a processor for executing automatic programming processing, and 103 a RAM for storing a system program read in from a floppy FL, as well as various parameters and results of processing. Numeral 104 denotes a NC data memory for storing the finally created NC data having an executable format, 105 a keyboard, 106 a display unit (CRT), 107 a disc controller, and 108 a tablet device having a tablet surface 108a to which a menu chart 108b having menu items is affixed. Prescribed menu items are picked or selected by a tablet cursor 108c. A graphic cursor on a display screen is moved by moving the cursor 108c on the tablet surface 108a. FL represents a floppy disc.

Figure 2:
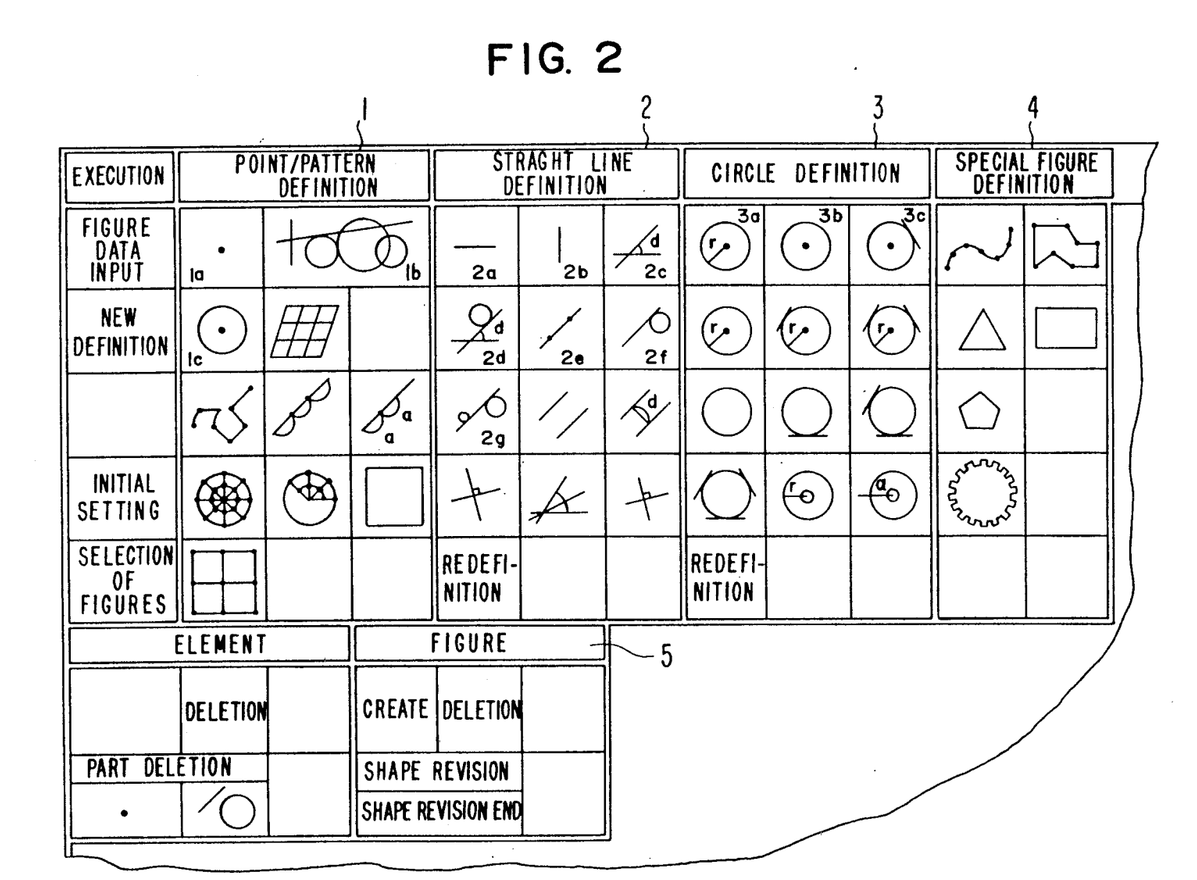
FIG. 2 is a chart describing the principal portion of a menu chart.

FIG. 2 is a view for describing the principal parts of the menu chart 108b. Numeral 1 is a "POINT/PATTERN DEFINITION" section, 2 is a "STRAIGHT LINE DEFINITION" section, 3 is a "CIRCLE DEFINITION" section, 4 is a "SPECIAL FIGURE DEFINITION" section and 5 is a "FIGURE EDITING" section. The "FIGURE EDITING" section 5 includes an "ELEMENT REVISION" item 5a and an "EXECUTE item 5b as illustrated in FIG. 1.

Figure 3:
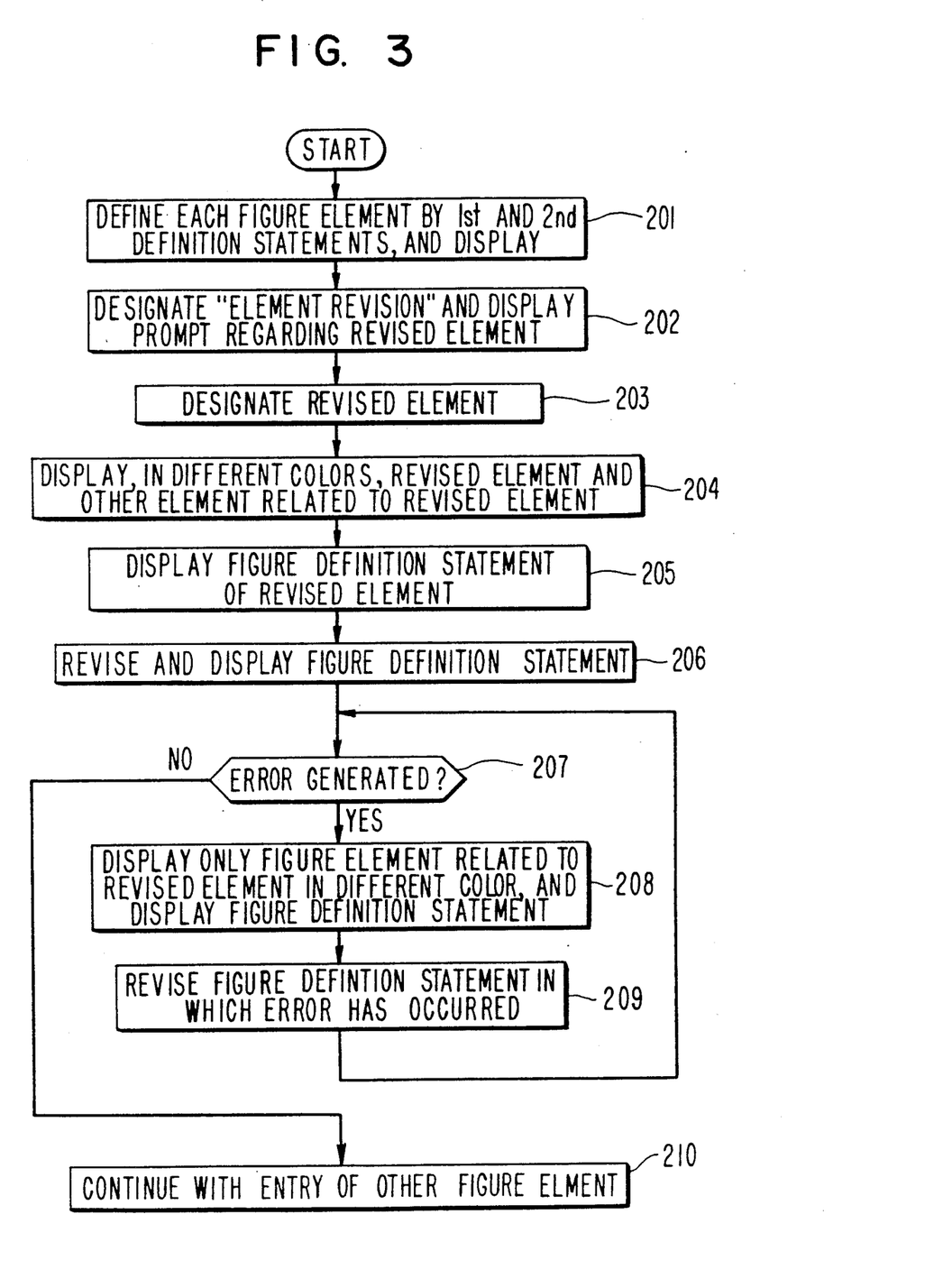
FIG. 3 is a flowchart illustrating the figure element revision processing according to the present invention.

FIG. 3 is a flowchart of figure element revision processing according to the invention, and FIGS. 4 through 7 are views for describing figure element revision processing. The figure element revising method of the invention will now be described in accordance with FIGS. 3 through 7. The system program for creating the NC part program, parameters and the like have already been stored in the RAM 103 from the floppy disc FL.

Figure 4:
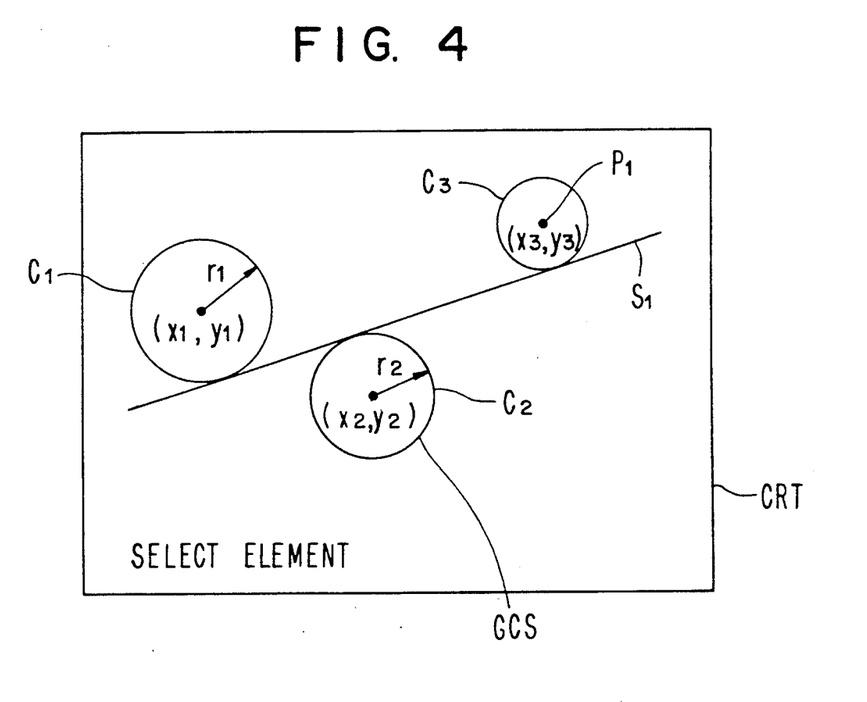
FIGS. 4 through 7 are diagrams describing an embodiment of the present invention.

The circles $C_1$, $C_2$, $C_3$, straight line $S_1$ and point $P_1$ shown in FIG. 4 are defined by the first definition statement based on a direct coordinate input, or by the second definition statement while citing figure elements displayed on the CRT 106, using the tablet 108 and keyboard 105. As for the figure definition statements, it is assumed that figure definition is performed as follows, just as described above in relation to FIG. 8:

$$C_1 = x_1, y_1, r_1$$

$$C_2 = x_2, y_2, r_2$$

$$P_1 = x_3, y_3$$

Each of the foregoing is a first definition statement.

$$S_1 = C_1, C_2, B, A$$

$$C_3 = P_1, S_1$$

Each of the foregoing is a second definition statement.

In the present invention, the figure definition statements are stored in the RAM 103 just as defined above, the entirety of the second definition statement is re-expressed by the first definition statement and is similarly stored in the RAM 103, and each figure element is displayed on the CRT 106 based on the first definition statement (FIG. 3, step 201).

Figure 6:
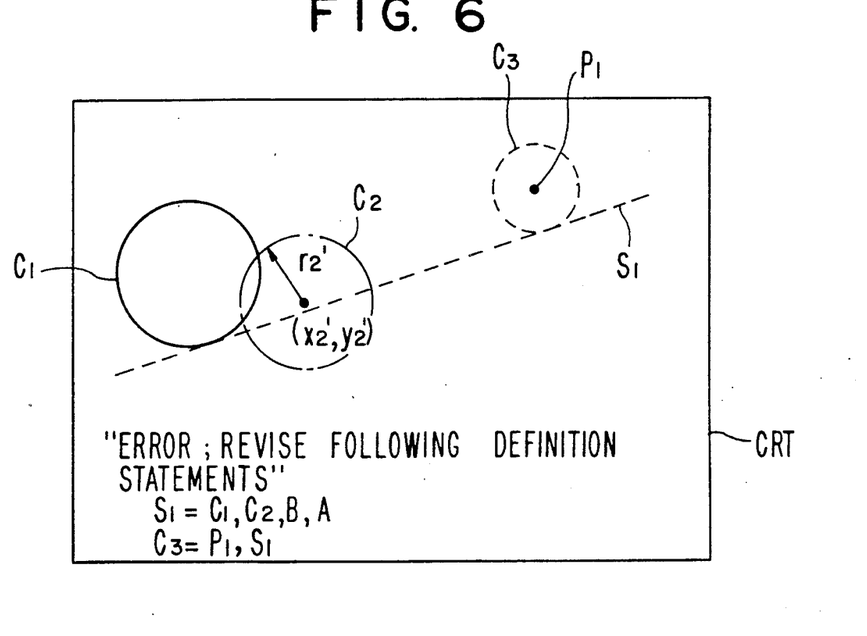
Figure 7:
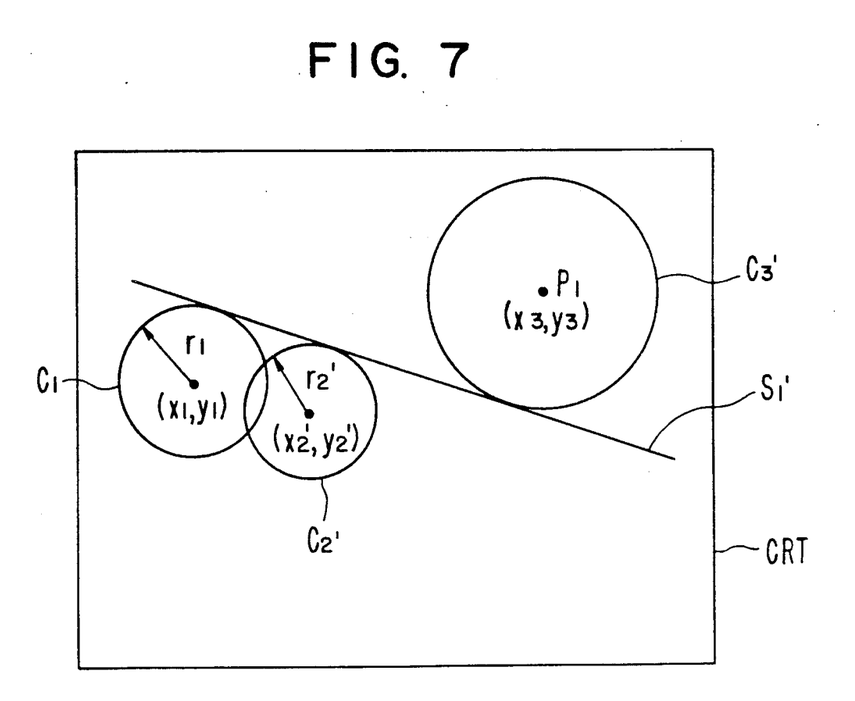

Under these conditions, assume that the circle $C_2$ (FIG. 4) among the group of figure elements displayed on the CRT 106 is re-defined as shown by the one-dot chain line in FIG. 6. In such case, the "ELEMENT REVISION" item 5a is picked from the menu chart 108b. In response to the selection of "ELEMENT REVISION", the processor 102 displays the prompt "SELECT ELEMENT" on the CRT 106 and causes the graphic cursor GCS to be displayed on the CRT in movable fashion (FIG. 3, step 202).

Figure 5:
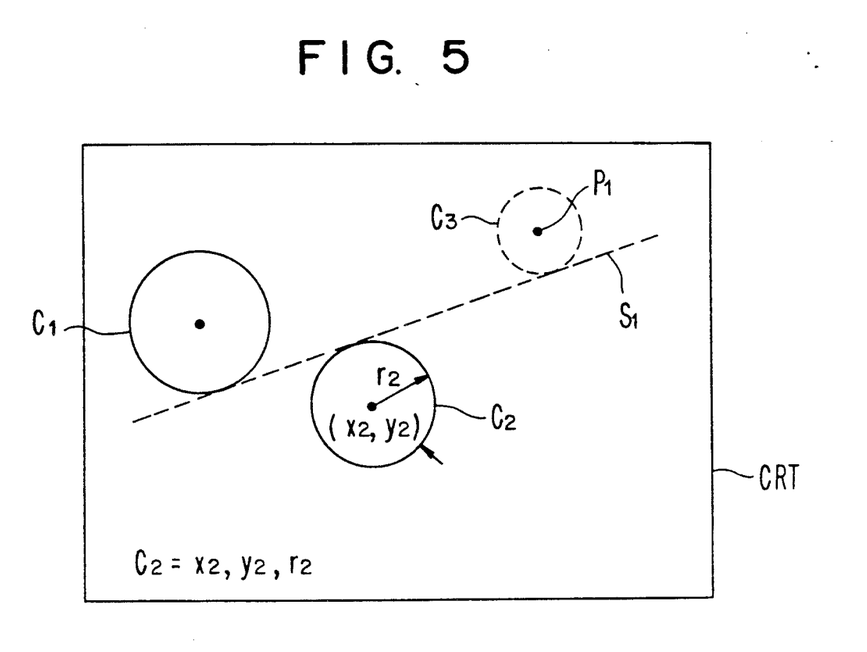

When graphic cursor GCS is positioned on the circle $C_2$, which is the element to be revised, in order to pick the same (FIG. 3, step 203; FIG. 4), the processor 102 obtains the figure elements related to the element namely circle $C_2$, which is the selected element, the figure element (straight line $S_1$ in the example) defined using the circle $C_2$, and the figure element (circle $C_3$ in the example) defined using the figure element $S_1$, and causes these figure elements to be displayed in different colors (FIG. 3, step 204; FIG. 5). For example, if all of the figure elements prior to revision are displayed in green, the circle $C_2$ may be displayed in red after it is selected, and the straight line $S_1$ and circle $C_3$ may be displayed in yellow.

The data necessary for element revision, namely the definition statement "$C_2=x_2, y_2, r_2$" is displayed on the CRT 106 to make possible revision of the selected element (FIG. 3, step 205).

Next, the operator modifies the definition statement of circle $C_2$ to "$C_2=x_2', y_2', r_2'$" picks the "EXECUTE" item 5b from the menu chart 108b to execute the revision. When this is done, the processor 102 changes the circle $C_2$ (FIG. 5) to the circle $C_2$ (the one-dot chain line in FIG. 6) and causes this to be displayed (FIG. 3, step 206).

At the same time, the processor 102 performs a check to determine whether an error has been generated in the definition statement of a figure element related to the circle $C_2$, namely whether existence of a figure element related to the circle $C_2$ is possible (FIG. 3, step 207). In this example, the definition statement of the straight line $S_1$, which is a figure element related to the circle $C_2$, is "$S_1=C_1, C_2, B, A$" (a straight line tangent to circle $C_1$ from below and tangent to circle $C_2$ from above). Consequently, it is impossible for the straight line $S_1$ to exist. The processor 102 therefore decides that the definition of the straight line $S_1$ is impossible and generates an error (referred to as a "definition error").

When a definition error is generated, the processor 102 causes the element (i.e., straight line $S_1$) specified by the figure definition statement in which the definition error has occurred, and the element (i.e., circle $C_3$) defined utilizing this element $S_1$, to be displayed in mutually different colors on the CRT 106. For example, if the displayed color of the figure elements is green for both circles $C_1$ and $C_2$, then the straight line $S_1$ will be displayed in red and the circle $C_3$ in yellow. Further, the processor 102 causes the data necessary for revision of the straight line $S_1$ and circle $C_3$, namely the following prompt and definition statements:

"ERROR; REVISE FOLLOWING DEFINITION STATEMENTS:

$S_1=C_1, C_2, B, A$ $C_3=P_1, S_1$"

to be displayed on the CRT 106 to make possible revision of the definition statements of straight line $S_1$ and circle $C_3$ (FIG. 3, step 208; FIG. 6).

The operator then for example revises the definition statement of straight line $S_1$ in which the definition error has occurred to "$S_1=C_1, C_2, A, A$" ( a straight line tangent to circle $C_1$ from above and tangent to circle $C_2$ from above), and picks the "EXECUTE" item 5b from the tablet menu chart 108 (step 209). When this is done, the processor 102 checks to determine whether a definition error has been generated (FIG. 3, step 207). If no definition error has been generated, the straight line $S_1$ displayed on the CRT 106 is revised to $S_1$, the circle $C_3$ is revised to circle $C_3'$, and the displayed colors are returned to the original color green (see FIG. 7) to make possible entry of the next figure element (FIG. 3, step 210).

Thus, in accordance with the present invention, a revision can be performed rapidly and with ease even if an error is generated, in a figure definition statement which utilizes the revised figure element.

What we claim is:

1. A figure element revising method for displaying a group of figure elements on a display screen, the group of figure elements includes defined figure elements and related figure elements defined using the defined figure elements, and for revising a designated figure element, said method comprising the steps of:
   (a) storing in advance a figure definition statement for each of the figure elements;
   (b) revising the figure definition statement of the designated figure element;
   (c) checking, when the figure definition statement of the designated figure element is revised, to determined whether an error has occurred in the figure definition statement of another figure element due to said revising in step (b) of the figure definition statement of the designated figure element;
   (d) displaying, when an error has occurred, the figure definition statement in which the error has occurred on the display screen and displaying, in different colors, the figure element specified by the figure definition statement in which the error has occurred and the related figure elements defined using the figure element in which the error has occurred;
   (e) revising the figure definition statement of the figure element in which the error has occurred to produce a revised figure definition statement; and
   (f) displaying, when the figure definition statement in which the error has occurred is revised, the figure element corresponding to the figure definition statement in which the error has occurred based on the revised figure definition statement.

2. A figure element revising method according to claim 1, wherein said method further comprises the step of (g) displaying the designated figure element in a manner distinguishable from another figure element, and the figure definition statement of the designated figure element on the display screen.

3. A figure element revising method according to claim 2, wherein said checking in step (c) determines the error has occurred when existence of the figure element specified by the figure definition statement of the another figure element is impossible.

4. A method for revising figure definition statements of an automatic programming language for figure elements to create numerical control data, said method comprising the steps of:
   (a) producing the figure definition statements for each of the figure elements, the figure definition statements for each of first figure definition statements based on coordinate inputs and second figure definition statements based on the first figure definition statements;
   (b) selecting one of the figure elements to be revised;
   (c) identifying the figure elements having figure definition statements based on the figure definition statement of the figure element selected in step (b);
   (d) revising the figure element definition of the figure element selected in step (b) to produce a revised figure element having a revised definition statement;
   (e) determining if any definition errors exist in the figure elements identified in step (c) due to said revising in step (d);

(f) identifying the figure elements determined in step (e) to have definition errors; and
(g) revising the figure element definitions of the figure elements identified in step (f).

5. A method according to claim 4, wherein said method further comprises the steps of:
(h) determining if any definition errors exist in the figure elements identified in step (f) due to the said revising in step (g);
(i) identifying the figure elements determined in step (h) to have definition errors; and
(j) revising the figure element definitions of the figure elements identified in step (i).

6. A method according to claim 4, wherein said method further comprises the steps of:
(h) displaying the figure elements identified in step (c) on a display screen; and
(i) displaying the figure elements identified in step (f) on the display screen.

7. A method according to claim 4, wherein said method further comprises the steps of:
(h) distinguishably displaying the figure elements identified in step (c) on a display screen;
(i) displaying the figure element selected in step (b) and the figure definition statement corresponding thereto on the display screen;
(j) displaying the revised figure element on the display screen;
(k) distinguishably displaying the figure elements identified in step (f); and
(l) displaying the figure definition statements corresponding to the figure elements identified in step (f) on the display screen.

8. A method according to claim 4, wherein said method further comprises the steps of:
(h) displaying the figure elements identified in step (c) on a display screen using a first color;
(i) displaying the figure element selected in step (b) using a second color and displaying the figure definition statement corresponding thereto on the display screen;
(j) displaying the revised figure element on the display screen; and
(k) displaying, in different colors, the figure elements identified in step (f) and displaying the figure definition statements corresponding thereto on the display screen.

* * * * *

UNITED STATES PATENT AND TRADEMARK OFFICE
CERTIFICATE OF CORRECTION

PATENT NO. : 5,065,332
DATED : November 12, 1991
INVENTOR(S) : Seki et al.

It is certified that error appears in the above-identified patent and that said Letters Patent is hereby corrected as shown below:

In the Drawings, Sheet 2 of 7, 3rd box, change "STRAGHT" to --STRAIGHT--.

Column 1, line 58, change "he" to --the--.

Column 3, line 18, change "recognize"

to --recognized--;

Column 5, line 52, change "then for example"

to --then, for example,--;

UNITED STATES PATENT AND TRADEMARK OFFICE
CERTIFICATE OF CORRECTION

PATENT NO. : 5,065,332
DATED : November 12, 1991
INVENTOR(S) : Seki et al.

It is certified that error appears in the above-identified patent and that said Letters Patent is hereby corrected as shown below:

Column 5, line 57, change "108 (step 209)"

to --108b (FIG. 3 step 209)--.

Column 6, line 1, change "generated," to

--generated--.

Column 6, line 16, change "mined" to --mine--.

Signed and Sealed this

Thirteenth Day of April, 1993

*Attest:*

STEPHEN G. KUNIN

*Attesting Officer*     *Acting Commissioner of Patents and Trademarks*